Nov. 13, 1923.　　　　　V. G. APPLE　　　　　1,474,134
BEARING
Filed May 5, 1921
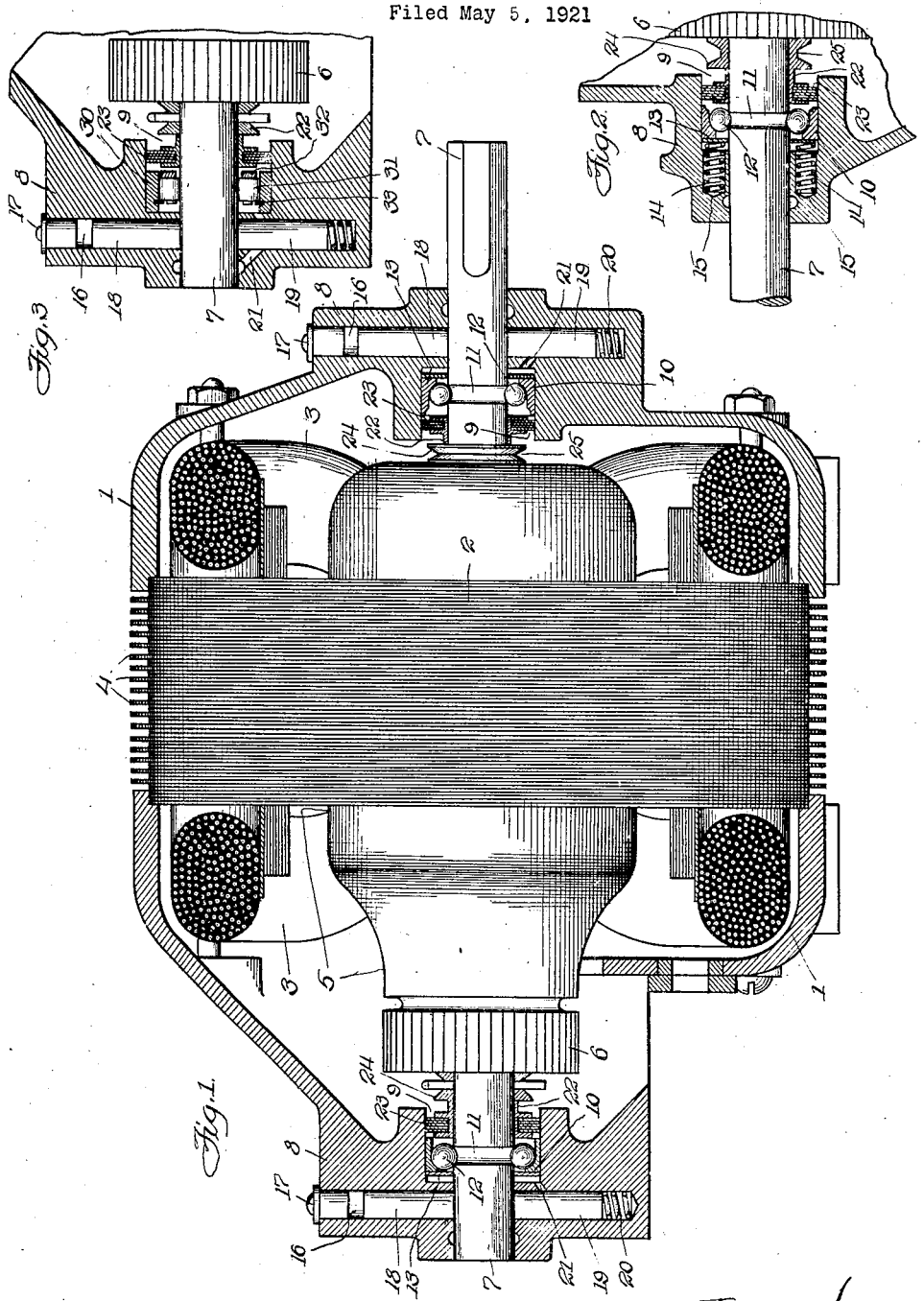
Inventor:
Vincent G. Apple
By Foree Bain & Hinkle
Attys Patented Nov. 13, 1923.

1,474,134

UNITED STATES PATENT OFFICE.

VINCENT G. APPLE, OF DAYTON, OHIO.

BEARING.

Application filed May 5, 1921. Serial No. 467,184.

*To all whom it may concern:*

Be it known that I, VINCENT G. APPLE, a citizen of the United States, residing at Dayton, in the county of Montgomery and State of Ohio, have invented certain new and useful Improvements in Bearings, of which the following is a specification.

This invention relates to bearings.

It will be explained as applied to a dynamo electric machine.

One of the objects of the invention is to provide an improved bearing.

Another object is to provide an improved anti-friction bearing.

Another object is to provide a bearing which will readily allow axial movement of the shaft.

Another object is to provide an improved oiling system for bearings.

Other objects and advantages will hereinafter appear.

Embodiments of the invention are illustrated in the accompanying drawings, wherein Fig. 1 is a vertical section through a dynamo electric machine equipped with the improved bearings.

Fig. 2 is a section through one of the bearings taken at a radial angle of ninety degrees from the section of Fig. 1, and Fig. 3 is a vertical section of a modified form of bearing.

The bearing is illustrated as applied to a dynamo electric machine having a frame 1 in the form of a housing containing the bearings and covering the armature, commutator, brushes, etc. The frame supports a suitable laminated field magnet structure 2 and field windings 3.

Some of the laminations of the field magnet are made larger than the rest to provide projecting ribs or fins 4 for facilitating ready radiation of heat.

The armature 5 and a commutator 6 are carried by a shaft 7.

Each bearing for shaft 7 is supported in the end of frame 1. The frame, at its opposite ends, is thickened into projecting bosses 8 which provide the necessary bearing chamber and support for the shaft and through which the shaft projects.

Each boss 8 is provided with a substantially cylindrical chamber 9 which forms the bearing housing. Fitting within chamber 9 is a hardened steel ring 10. Ring 10 has a curved inner annular surface to form one of the elements of a ball race. The other element of the ball race is formed by a groove 11 in shaft 7. In the race provided by ring 10 and groove 11 are a series of hardened balls 12.

An annular ring disc 13 fits within cylindrical chamber 9 against the outside end of ring 10. A series of helical springs 14 are seated in suitable holes 15 provided in the bottom or base of chamber 9 and bear against disc 13. The number of these springs may be varied as conditions seem to require. Four springs, symmetrically spaced about the axis and in planes substantially forty-five degrees from the horizontal and vertical, have been found to give good results. These springs exert pressure against disc 13 and consequently against ring 10 and thus keep the outer element of the ball race firmly but yieldingly against the balls.

The rotating shafts of machines are often subject to axially directed forces. The resultant thrust on rigid bearings is objectionable in many instances. Thus, for example, in dynamo electric machines under careful design and manufacture the magnetic forces may tend to displace the armature slightly in an axial direction. With the use of rigid bearings this action produces friction which may be objectionably excessive.

With the improved construction hereinbefore described this axial movement is permitted and the friction is therefore reduced. The balls, being set in the groove in the shaft, follow the axial movements thereof because of the sliding fit of the ring which forms the outer member of the ball race. However, because of the constant force exerted by the springs, the race is maintained yieldingly tight. Axial movement is thus permitted but radial movement with resultant eccentric rotation and noise is prevented.

The bearing is oiled through an oil hole or cup 16 which is closed by a suitable cap 17. Cup 16 is formed by providing a vertically directed hole from the top of boss 8 through the shaft opening and into the bottom of the boss. The upper and lower or above and below shaft sections of cup 16 are filled with absorbent and capillary wicks 18 and 19, respectively. These wicks may be in the form of rather dense sticks or cylinders of felt or other suitable material. Lower wick 19 is pressed upwardly into engagement with shaft 7 by a helical spring 20. A small passage 21 inter-connects cup 16 and chamber 9.

Chamber 9 is closed around the shaft at its open end to prevent escape of oil. This closure is provided by securing a collar 22 to shaft 7 and fitting an oil retaining washer between the collar and the inner surface of chamber 9. Collar 22 is provided with an annular groove into which is secured a series of felt discs 23 forming the closing washer. Discs 23 are of such a size that they fit tightly against the inner wall of the bearing chamber and, because of their flexibility and resiliency, they tightly close the chamber but do not appreciably interfere with the axial movement of the shaft. Collar 22 may be provided with an annular enlargement 24 having a tapering walled channel 25 which aids in preventing oil, which may escape from the bearing chamber, from reaching the armature or commutator. Any oil which may escape from the bearing chamber and attempt to creep along the shaft will be thrown off the more extended surfaces where the centrifugal action is greatest. The oil, because of this centrifugal action, will not pass from the more extended surfaces to those less extended. In other words, the oil will not flow or creep readily inwardly or down the sloping walls of the tapered channel 25.

The capillary action of the wicks keeps the oil circulating in a substantially closed path including the ball races, balls and passage 21 so that replenishment is ordinarily required only at long intervals to keep the bearings properly lubricated.

Fig. 3 shows a modified bearing wherein cylindrical rollers are employed in place of balls. Bearing chamber 9 is provided with a ring 30, which, however, in this case is not under spring pressure and need not slide within the chamber. Rollers 31 are mounted in and pivotally carried by a suitable cage 32. A ring 33 set into ring 30 assists in holding the rollers and cage in position in the bearing chamber. The rest of the roller bearing is the same as the previously described ball bearing. Shaft 7 may move axially through the series of rollers allowing substantially the same freedom of movement as the ball bearing.

Having described my invention what I claim as new and desire to secure by Letters Patent, is:—

1. A bearing comprising a frame having a chamber therein through which a shaft may pass, a ring fitting within the chamber, anti-friction means interposed between the ring and shaft, and fibrous flexible closure for the chamber carried by the shaft with the fibrous material in contact with the walls of the chamber, and means for oiling the bearing.

2. A bearing comprising a frame having an open ended substantially cylindrical chamber therein, a shaft passing axially through the chamber, anti-friction means interposed between the shaft and the walls of the chamber, and a fibrous flexible ring carried by the shaft and bearing on the walls of the chamber for closing the open end of the chamber to prevent the escape of oil therefrom and means to automatically supply oil to the chamber.

3. A bearing comprising a frame having a chamber therein, a shaft projecting into the chamber and having a circumferential groove therein within the chamber, a series of balls set in the groove of the shaft, a ring slidably mounted in the chamber and encircling the series of balls, and a spring pressed disc for holding the ring yieldingly against the balls to allow movement thereof parallel to the axis of the shaft.

4. A bearing comprising a frame having an open ended cylindrical chamber therein, a shaft projecting into said chamber and having a circumferential groove therein, a flanged ring slidably fitting within the chamber, a series of balls in the shaft groove and encircled by the flanged ring, a spring for yieldingly pressing the flange of the ring against the balls, and a fibrous disc carried by the shaft and closing the open end of the chamber.

5. A bearing comprising a frame having an open ended cylindrical chamber therein, a shaft projecting into said chamber and having a circumferential groove therein, a flanged ring slidably fitting within the chamber, a series of balls in the shaft groove and encircled by the flanged ring, a spring for yieldingly pressing the flange of the ring against the balls, a fibrous disc carried by the shaft and closing the open end of the chamber, and an oil cup leading to the shaft to convey oil to the chamber.

In testimony whereof I hereunto subscribed my name.

VINCENT G. APPLE.